United States Patent
Holmberg

(10) Patent No.: US 8,378,607 B2
(45) Date of Patent: Feb. 19, 2013

(54) METHOD AND ARRANGEMENT FOR OPERATING A SHIP RAMP

(75) Inventor: Mikael Holmberg, Porvoo (FI)

(73) Assignee: ABB Oy, Helsinki (FI)

( * ) Notice: Subject to any disclaimer, the term of this patent is extended or adjusted under 35 U.S.C. 154(b) by 345 days.

(21) Appl. No.: 12/878,654

(22) Filed: Sep. 9, 2010

(65) Prior Publication Data

US 2011/0071684 A1 Mar. 24, 2011

(30) Foreign Application Priority Data

Sep. 23, 2009 (EP) .................................... 09171057

(51) Int. Cl.
    *H02P 7/00* (2006.01)
(52) U.S. Cl. ........................................ 318/432; 318/433
(58) Field of Classification Search .................. 318/432, 318/433
    See application file for complete search history.

(56) References Cited

U.S. PATENT DOCUMENTS

| | | | |
|---|---|---|---|
| 3,906,315 A | 9/1975 | Gotisar | |
| 4,024,023 A | 5/1977 | Jonnet | |
| 7,230,393 B2 * | 6/2007 | Hommi et al. | 318/52 |
| 2005/0216116 A1 | 9/2005 | Nield | |
| 2005/0253125 A1 | 11/2005 | Drarvik et al. | |
| 2006/0175997 A1 * | 8/2006 | Hommi et al. | 318/432 |

OTHER PUBLICATIONS

European Search Report for EP 09171057.4 dated Dec. 8, 2009.

* cited by examiner

*Primary Examiner* — Thomas Dougherty
(74) *Attorney, Agent, or Firm* — Buchanan Ingersoll & Rooney PC

(57) ABSTRACT

A method and arrangement are provided for operating a ship ramp driven by an electric motor between an upper end position and a lower end position. The arrangement includes means for reducing the maximum torque of the at least one electric motor when the ramp is in proximity to an end position of the ramp, and means for determining the position of the ramp on the basis of at least one of the number of rotations performed by the at least one electric motor, a quantity indicative of the number of rotations, and an elapsed time in accordance with the velocity of the ramp. The arrangement also includes means for allowing the reduction of the maximum torque of the at least one electric motor only when the determined position of the ramp is within a zone defined by predetermined limits.

23 Claims, 1 Drawing Sheet

METHOD AND ARRANGEMENT FOR OPERATING A SHIP RAMP

RELATED APPLICATION

This application claims priority under 35 U.S.C. §119 to European Patent Application No. 09171057.4 filed in Europe on Sep. 23, 2009, the entire content of which is hereby incorporated by reference in its entirety.

FIELD

The present disclosure relates to a method and arrangement for operating a ship ramp driven by an electric motor.

BACKGROUND INFORMATION

Ship ramps such as a ro-ro (roll-on/roll-off) vessel or car ferry gate ramps are known to be driven by hydraulic systems. However, the use of hydraulic systems poses a potential risk of pollution or damage to goods in case there is a leakage of hydraulic oil used by the hydraulic system. Also, hydraulic systems may require to be continuously operated in order to keep the system pressurized, which consumes energy. Thus, electric systems are becoming more popular in ship ramp drives. Electric systems which drive the ship ramp by means of one or more electric motors can be simple to install and monitor during use and can also be maintenance-friendly. In addition, electric systems may provide considerable energy savings.

When the ship ramp is closing and near an upper end position (closed position), it may be desirable to reduce the electric motor maximum torque to ensure smooth closing of the ramp. With a reduced maximum torque, the seals on the ship ramp have a longer lifetime and there is less mechanical stress on the components. It is possible to reduce the maximum torque when the ramp is near the upper end position because then there is a reduced requirement for torque. The torque reduction in the proximity of the upper end position may be implemented by means of a proximity switch or sensor, by an operator command, and/or by controlling the motor supply system, e.g. an inverter, to limit the maximum torque of the motor.

When the ship ramp is opening and near a lower end position (open position), it may be desirable to put the ramp in tension or to a hold position (e.g., hanging on the harbor pier) without lifting the ramp up. This can be accomplished so that the maximum torque level of the electric motor is reduced to keep ramp winch wires tight and to take a part of the ramp load without lifting the ramp up. The torque reduction in the proximity of the lower end position may again be implemented by means of a proximity switch or sensor, by an operator command, and/or by controlling the motor supply system, e.g. an inverter, to limit the maximum torque of the motor.

However, in the aforementioned types of torque reduction, if for some reason, such as a defect in a proximity switch or a human error, the torque reduction is performed when the ramp is in a wrong position, e.g. midway between the end positions, the control of the ramp may be lost because of the reduced torque level and the ramp may, as a result, crash down uncontrollably. Especially in the case of heavy ramps such as ro-ro ship gate ramps, such an event may cause substantial damage to the equipment and also personal injuries.

SUMMARY

An exemplary embodiment provides a method for operating a ship ramp between an upper end position and a lower end position. The exemplary method includes driving the ramp towards the upper end position or the lower end position by at least one electric motor, and reducing a maximum torque of the at least one electric motor when the ramp is in proximity to an end position of the ramp. The exemplary method also includes allowing the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

An exemplary embodiment provides an arrangement for operating a ship ramp driven by an electric motor between an upper end position and a lower end position. The exemplary arrangement includes means for reducing the maximum torque of the at least one electric motor when the ramp is in proximity to an end position of the ramp. The exemplary arrangement also includes means for allowing the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

An exemplary embodiment provides a system for operating a ship ramp driven by an electric motor between an upper end position and a lower end position. The exemplary system includes a processing device configured to reduce the maximum torque of the at least one electric motor when the ramp is in proximity to an end position of the ramp. In addition, the processing device is configured to allow the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method, arrangement, system and computer-recording medium having a computer program recorded thereon, which allow the reduction of the maximum torque of an at least one electric motor driving the ramp only when the position of the ramp, which is determined on the basis of at least one of the number of rotations performed by the at least one electric motor, or a quantity indicative thereof, and the elapsed time and the velocity of the ramp, is within a zone defined by predetermined limits.

Exemplary embodiments of the present disclosure prevent the reduction of the electric motor maximum torque unless the ship ramp is in a proper position in which the torque can be safely reduced, which improves the safety of the operation of the ramp.

Figure 1:
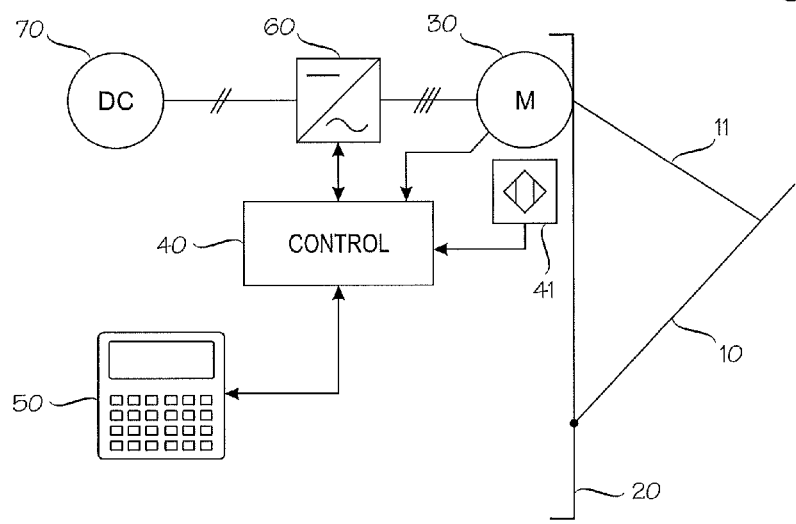
FIG. 1 illustrates a block diagram of an exemplary arrangement according to at least one embodiment of the present disclosure.

FIG. 1 illustrates a simplified block diagram of an arrangement according to an exemplary embodiment of the present disclosure. FIG. 1 shows components for understanding the illustrated exemplary embodiment of the present disclosure. Those skilled in the art will appreciate that other components could be integrated with the exemplary arrangement illustrated in FIG. 1. The example shows a ramp 10 of a ship 20. The ramp 10 in the example is driven by means of one or more electric motors 30 via a winch 11. It should be noted that the motor 30 can also be connected to the ramp 10 in another way without using a winch. The one or more electric motors 30 can be of any type, such as an asynchronous AC motor (e.g., an induction motor), a synchronous AC motor, or a DC motor, for example. Moreover, the present disclosure is not limited to systems employing any specific fundamental frequency or any specific voltage level. In the example of FIG. 1, the motor 30 is an induction motor fed by an inverter 60 from a DC power supply 70. An inverter is a device used, for example, for controlling a motor. The control of the motor 30 may be implemented reliably by means of the inverter 60 in such a manner that the motor 30 accurately implements a desired speed or torque instruction, for example. The exemplary arrangement further includes a separate control unit 40 which may be used to control the motor 30 and to operate the ramp 10. The control unit 40 may also be a part of the inverter 60 or some other component of the exemplary arrangement, for example. The control unit 40 can be accessed through an I/O (Input-Output) device 50 such as a keyboard and display unit or another terminal unit which may be connected to the control unit 40 in a wired or wireless manner. Thus, an operator of the arrangement can operate the ramp 10 through the I/O device 50. The control unit 40 may also include suitable I/O means instead of or in addition to a separate I/O device 50. FIG. 1 also shows the arrangement including a proximity sensor and/or a proximity (limit) switch 41, which may be used to detect the proximity of the ramp 10 to the end position of the ramp 10. There may be more than one proximity sensor and/or proximity switch 41, and they may be used to detect the proximity of the ramp 10 to the upper end position of the ramp 10 and/or the lower end position of the ramp 10.

Figure 2:
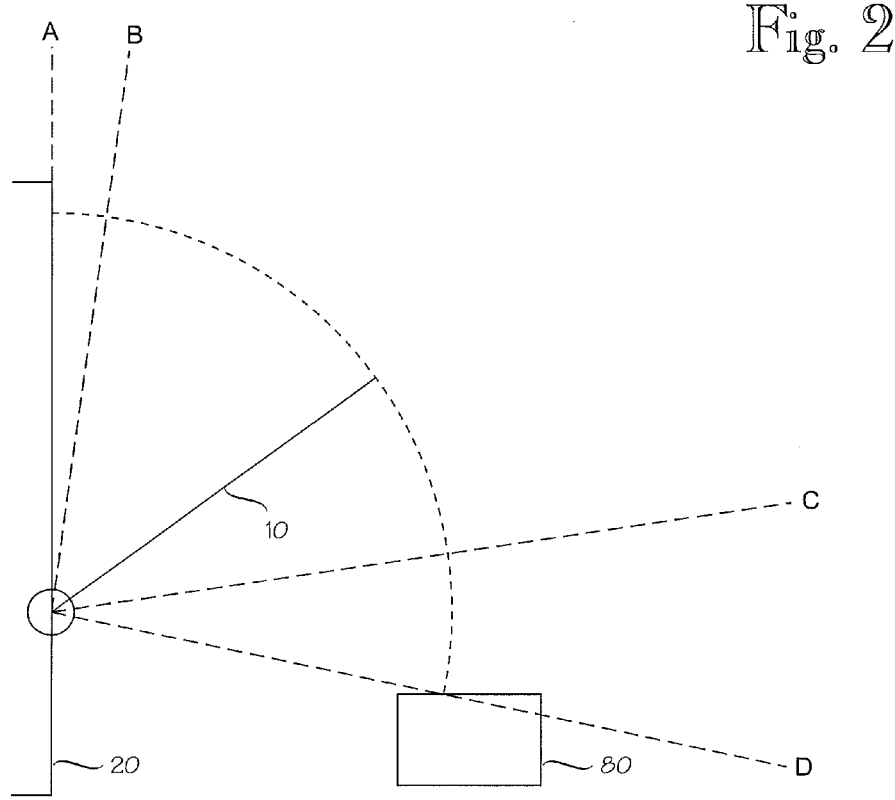
FIG. 2 illustrates a diagram in accordance with an exemplary embodiment of the present disclosure.

FIG. 2 shows a diagram illustrating the operation of the ramp 10 according to an exemplary embodiment of the present disclosure. In FIG. 2, position A represents the upper end (closed) position of the ramp 10, and position D represents the lower end (open) position of the ramp 10 in which the ramp 10 may be hanging on the harbor pier 80. According to an exemplary embodiment, when the ramp 10 is being closed and near the upper end position A, the maximum torque of the electric motor 30 can be reduced to ensure smooth closing of the ramp 10 without causing undue stress on the ramp components. The torque reduction in the proximity of the upper end position A may be implemented by means of a proximity switch and/or sensor 41, by an operator command through the I/O means 50, and/or by controlling the motor supply system, i.e. the inverter 60 in the example of FIG. 1, to limit the maximum torque of the motor 30. The distance from the upper end position A where the proximity of the ramp 10 is detected can depend on the particular construction of the ramp system. In a corresponding manner, when the ship ramp is being opened and near or in the lower end position D, the ramp 10 can be put in tension or be placed in a hold position without lifting the ramp up. According to an exemplary embodiment, this can be accomplished by reducing the maximum torque level of the motor 30 to keep the winch 11 wires of the ramp 10 tight and to take a part of the ramp load without lifting the ramp 10 up. The torque reduction in the proximity of the lower end position D may again be implemented by means of a proximity switch and/or sensor 41, by an operator command, and/or by controlling the motor supply system, e.g. an inverter 60, to limit the maximum torque of the motor 30.

According to an exemplary embodiment, the position of the ramp 10 can be determined during the operation of the ramp 10 when the ramp 10 is being driven towards the upper end position A or towards the lower end position D on the basis of the number of rotations performed by the at least one electric motor 30, and/or another quantity indicative of the number of rotations. The number of rotations performed by the motor 30 may be determined by means of a rotary encoder connected to the motor 30. The rotary encoder may be an incremental encoder or an absolute encoder, for example. The encoder can be connected to the shaft of the motor 30 or may be an integral part of the motor 30. Alternatively, the encoder can also be connected to another rotating part of the motor winch assembly. The feedback signal from the rotary encoder can be delivered to the control unit 40 or a corresponding entity, which can then determine the actual position of the ramp 10 on the basis of the signal by counting the rotations and scaling the number of the rotations into an actual position of the ramp 10. According to an exemplary embodiment, the position of the ramp 10 can be determined starting from a reference position of the ramp. Such a reference position of the ramp 10 may be the upper end position A or the lower end position D of the ramp, for example. The ramp position can be reset when the ramp 10 is in the reference position to compensate for winch wire 11 elongation, for example. Alternatively, the position of the ramp 10 can be determined during the operation of the ramp on the basis of the elapsed time in accordance with the velocity of the ramp 10. The velocity of the ramp 10 may be determined, by using suitable scaling when necessary, from the rotation speed of the motor 30, which may be obtained by means of a rotary encoder or a tachometer connected to the motor 30, or from the inverter 60, for example. The rotation speed information can be delivered to the control unit 40 or a corresponding entity which can then determine the actual position of the ramp 10 on the basis of the speed and the elapsed time. The determined position of the ramp 10 can be stored in a memory of the control unit 40, for example. In this way, the current position of the ramp 10 can always be known even in the case of a power failure during the operation, for example.

According to an exemplary embodiment, the determined position of the ramp 10 can then be employed by allowing the reduction of the maximum torque of the at least one electric motor 30 only when the determined position of the ramp is within a zone defined by predetermined limits. In other words, according to an exemplary embodiment of the present disclosure, the reduction of the maximum torque of the motor 30, in response to, for example, a signal from the proximity sensor and/or switch 41 and/or an operator command, is only allowed when the position of the ramp 10 is within the predetermined limits. If the position of the ramp 10 is not within the predetermined limits, then the reduction of the motor maximum torque is prevented. According to an exemplary embodiment, the predetermined limits can define an upper zone and/or a lower zone. The direction of movement of the ramp 10 may further be taken into account such that the zone defined by the predetermined limits is applicable only when the ramp 10 is driven towards a certain end position, e.g., either towards the upper end position A or towards the lower end position D. For example, the torque reduction near the upper end position A of the ramp might only be needed when closing the ramp 10 and, thus, the torque reduction near the upper end position A of the ramp could be allowed only when the ramp is being closed but not when the ramp is being opened. According to an exemplary embodiment, the predetermined limits define an upper zone, which only applies when the ramp is driven towards the upper end position A, and/or a lower zone, which only applies when the ramp is driven towards the lower end position D. In other words, it is possible to define only one zone which is only used for the operation of either closing or opening the ramp 10, or two zones such that one zone is used for the operation of opening the ramp and the second zone is used for the operation of closing the ramp. More than two such zones could also be defined, if appropriate, depending on the ramp structure.

FIG. 2 illustrates examples of such zones. In FIG. 2, positions A and B are examples of the predetermined limits defining an upper zone. The upper zone may apply only when the ramp 10 is driven towards the upper end position A. Thus, when the ramp 10 is driven towards the upper end position A, the reduction of the motor maximum torque could be allowed only when the determined position of the ramp 10 is between positions A and B. In a similar manner, positions C and D are examples of the predetermined limits defining a lower zone. The lower zone may apply only when the ramp 10 is driven towards the lower end position D. Thus, when the ramp 10 is driven towards the lower end position D, the reduction of the motor maximum torque could be allowed only when the determined position of the ramp 10 is between positions C and D. It is also possible that the reduction of the motor maximum torque is allowed when the determined position of the ramp 10 is between positions A and B and/or between positions C and D regardless of the direction of movement of the ramp.

According to an exemplary embodiment, the upper zone can be limited by the upper end position A and a predetermined distance from the upper end position (corresponding to position B in FIG. 2). The size of the upper zone between the two positions A and B depends on the particular structure of the ramp assembly in question. The present disclosure is thus not limited to any particular size. In a similar manner, according to an exemplary embodiment, the lower zone can be limited by the lower end position D and a predetermined distance from the lower end position (corresponding to position C in FIG. 2). Also, the size of the lower zone between the two positions C and D depends on the particular structure of the ramp assembly in question. The present disclosure is thus not limited to any particular size. The upper and/or lower zones can be reconfigurable by the operator of the system via the I/O means 50, for example. For example, the lower end position D may vary depending on the displacement of the ship and the height of the harbour pier level. Thus, it may be appropriate to reconfigure, for example, the lower zone C-D limits depending on the particular case.

An apparatus implementing the control functions according to any one of the above embodiments, or a combination thereof, may be implemented as one unit or as two or more separate units that are configured to implement the functionality of the various embodiments. Here the term 'unit' refers generally to a physical or logical entity, such as a physical device or a part thereof, and/or a computer-readable recording medium having a computer program recorded thereon that causes a computing device (e.g., a device with a computer processor) to execute prescribed operations defined in the program. One or more of these units, such as the control unit 40, may reside in an electric drive or a component thereof such as the inverter 60, for example.

An apparatus, such as the control unit 40, according to any one of the exemplary embodiments described above, may be implemented at least partly by means of one or more computers or corresponding digital signal processing (DSP) equipment for executing a computer-readable program recorded on a computer-readable recording medium, for example. As used herein, a computer-readable recording medium is a non-transitory non-volatile memory (e.g., ROM, hard disk drive, optical memory, flash memory, etc.) configured to have recorded thereon programs such as specific application programs and/or an operating program. Such a computer or digital signal processing equipment can include at least a working memory (RAM) providing storage area for arithmetical operations and a central processing unit (CPU), such as a general-purpose digital signal processor. The CPU can include a set of registers, an arithmetic logic unit, and a CPU control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing exemplary embodiments of the present disclosure, or a part thereof, can also include suitable input means for receiving e.g. measurement and/or control data, and output means for outputting e.g. control data. It is also possible to use a specific integrated circuit or circuits, or discrete electric components and devices for implementing the functionality according to any one of the exemplary embodiments described herein.

The present disclosure, according to any one of the exemplary embodiments described herein, or any combination thereof, can be implemented in existing system elements, such as electric drives or components thereof, such as inverters or frequency converters, or similar devices, or by using separate dedicated elements or devices in a centralized or distributed manner. Present devices for electric drives, such as inverters and frequency converters, can include processors and memory that can be utilized in the functions according to the exemplary embodiments of the present disclosure. Thus, all modifications and configurations required for implementing an embodiment of the present disclosure, e.g. in existing devices, may be performed by a computer executing software routines, which may be implemented as added or updated software routines. If the functionality of the disclosure is implemented by a computer executing software, the software, when run on a computer, can cause the computer or corresponding arrangement to perform the functionality according to the exemplary embodiments of the present disclosure as described above. Such a program may be stored or generally embodied on a computer readable medium, such as suitable memory, e.g. a flash memory or a disc memory from which it is loadable to the unit or units executing the program code. In addition, such a program implementing exemplary embodiments of the present disclosure may be loaded to the unit or units executing the program via a suitable data network, for example, and it may replace or update a possibly existing program code.

It will be apparent to a person skilled in the art that as technology advances, the basic idea of the present disclosure can be implemented in a variety of ways. Consequently, the present disclosure and its embodiments are not restricted to the above examples, but can vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for operating a ship ramp between an upper end position and a lower end position, the method comprising:
driving the ramp towards the upper end position or the lower end position by at least one electric motor;
reducing a maximum torque of the at least one electric motor when the ramp is in proximity to an end position of the ramp; and
allowing the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

2. The method of claim 1, wherein the position of the ramp is determined starting from a reference position of the ramp.

3. The method of claim 2, wherein the reference position of the ramp is the upper end position or the lower end position of the ramp.

4. The method of claim 1, wherein the predetermined limits define at least one of an upper zone and a lower zone.

5. The method of claim 4, wherein the upper zone applies only when the ramp is driven towards the upper end position.

6. The method of claim 4, wherein the upper zone is limited by the upper end position and a predetermined distance from the upper end position.

7. The method of claim 1, wherein the proximity of the ramp to the end position of the ramp is detected by at least one of a signal from an operator, a proximity sensor, and a proximity switch.

8. The method of claim 1, comprising:
determining the number of rotations performed by the at least one electric motor by means of a rotary encoder connected to the at least one electric motor.

9. The method of claim 8, wherein the rotary encoder is one of an incremental encoder and an absolute encoder.

10. A computer recording medium having a computer program recorded thereon that causes a computer to carry out the method of claim 1.

11. An arrangement for operating a ship ramp driven by an electric motor between an upper end position and a lower end position, the arrangement comprising:
means for reducing the maximum torque of the at least one electric motor when the ramp is in proximity to an end position of the ramp; and
means for allowing the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

12. The arrangement of claim 11, wherein the predetermined limits define at least one of an upper zone and a lower zone.

13. The arrangement of claim 12, wherein the upper zone is limited by the upper end position and a predetermined distance from the upper end position.

14. The arrangement of claim 11, wherein the means for reducing the maximum torque detect the proximity of the ramp to the end position of the ramp in response to at least one of a signal from an operator and a signal from at least one of a proximity sensor and a proximity switch.

15. The arrangement of claim 11, wherein the means for allowing the reduction of the maximum torque determine the number of rotations performed by the at least one electric motor by means of a rotary encoder connected to the at least one electric motor.

16. The arrangement of claim 15, wherein the rotary encoder is one of an incremental encoder and an absolute encoder.

17. A system for operating a ship ramp driven by an electric motor between an upper end position and a lower end position, the system comprising a processing device configured to:
reduce the maximum torque of the at least one electric motor when the ramp is in proximity to an end position of the ramp; and
allow the reduction of the maximum torque of the at least one electric motor only when the position of the ramp, which is determined on the basis of at least one of a number of rotations performed by the at least one electric motor, a numerical quantity indicative of the number of rotations performed by the at least one electric motor, and an elapsed time in accordance with a velocity of the ramp, is determined to be within a zone defined by predetermined limits.

18. The method of claim 4, wherein the lower zone applies only when the ramp is driven towards the lower end position.

19. The method of claim of claim 5, wherein the lower zone applies only when the ramp is driven towards the lower end position.

20. The method of claim 4, wherein the lower zone is limited by the lower end position and a predetermined distance from the lower end position.

21. The method of claim 6, wherein the lower zone is limited by the lower end position and a predetermined distance from the lower end position.

22. The arrangement of claim 12, wherein the lower zone is limited by the lower end position and a predetermined distance from the lower end position.

23. The arrangement of claim 13, wherein the lower zone is limited by the lower end position and a predetermined distance from the lower end position.

* * * * *